No. 119,617.    Patented Oct. 3, 1871.

D. E. KEATING.

Mechanical Movement.

ATTEST
Myron H. Church
H. F. Eberts

INVENTOR
D. E. Keating
per attorneys
Prindle & Azer

UNITED STATES PATENT OFFICE.

DANIEL E. KEATING, OF OSWEGO FALLS, NEW YORK.

IMPROVEMENT IN MECHANICAL MOVEMENTS.

Specification forming part of Letters Patent No. 119,617, dated October 3, 1871.

*To all whom it may concern:*

Be it known that I, DANIEL E. KEATING, of Oswego Falls, in the county of Oswego and State of New York, have invented a new and useful Improvement in a Mechanical Movement; and I do declare that the following is a true and accurate description thereof, reference being had to the accompanying drawing and to the letters of reference marked thereon and being a part of this specification, in which—

Figure 1:
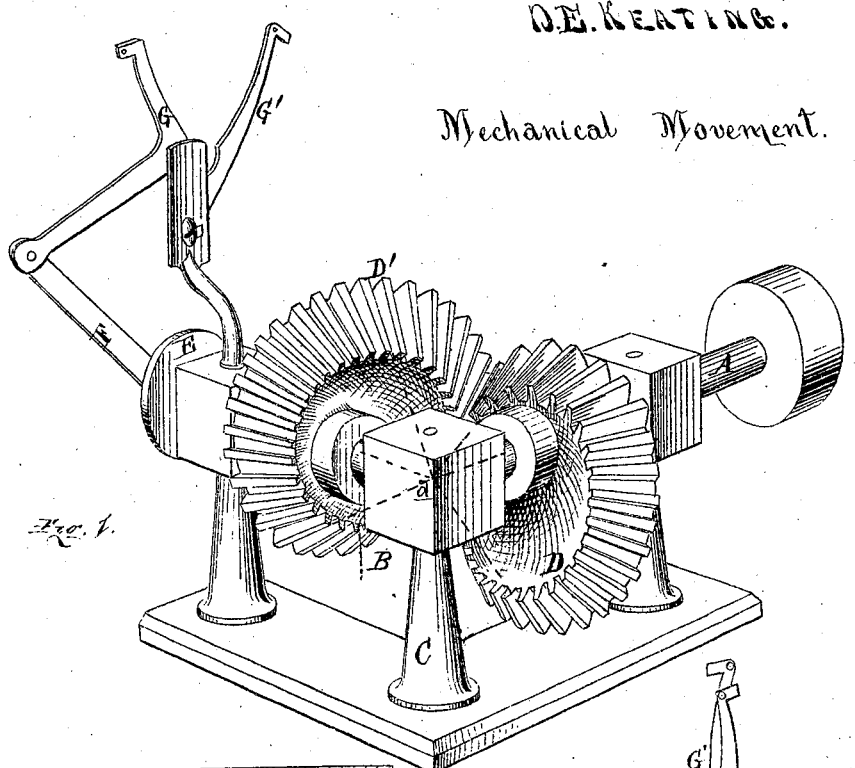
Figure 2:
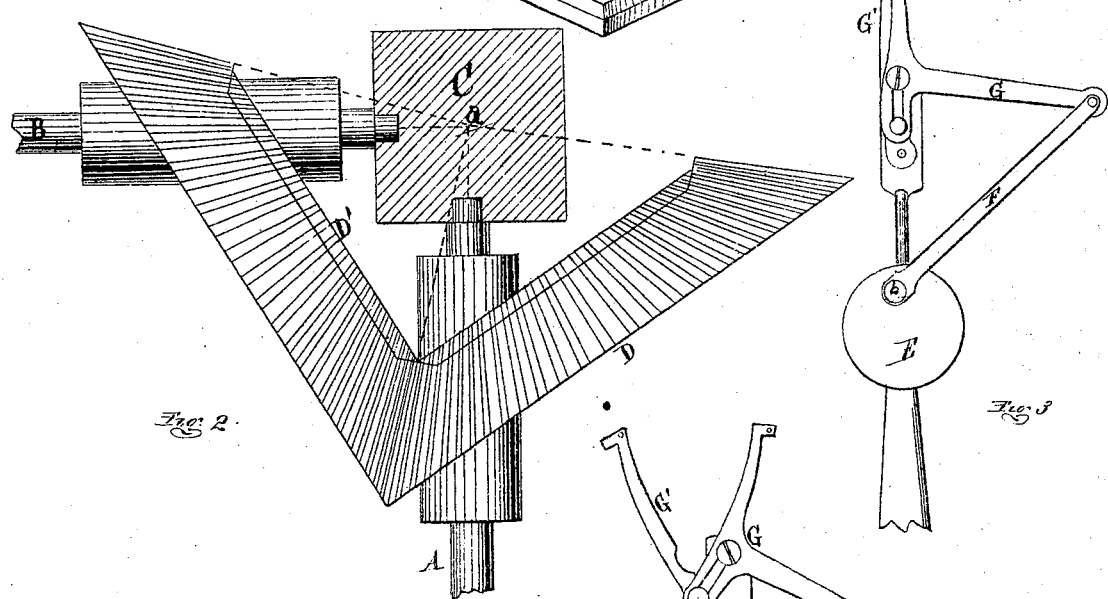
Figure 3:
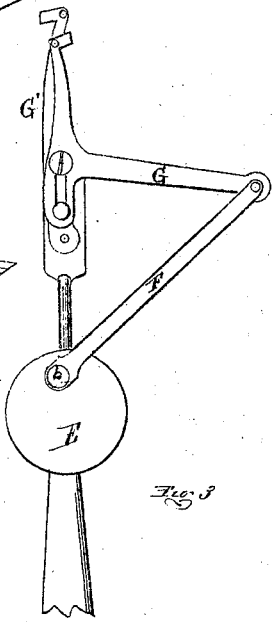
Figure 4:
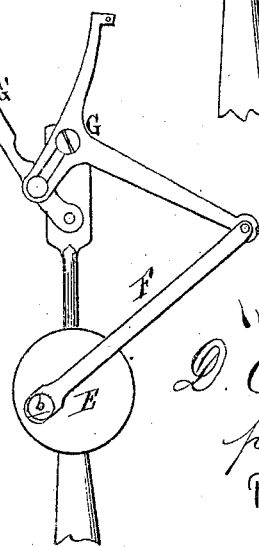

Figure 1 is a perspective view of my improvement as applied to the shedding mechanism of a Crompton loom. Fig. 2 is a plan of the eccentric miter-gears, and Figs. 3 and 4 are front elevations of the shedding-levers in their different positions.

Similar letters of reference indicate corresponding parts in the several figures.

This invention relates to a new and useful mechanical movement designed to convert continuous rotary motion of the driving-shaft into variable motion in a driven shaft at an angle with the driver through beveled cam or eccentric gears peculiarly adapted to the successful operation of the shedding mechanism of looms, although useful in other situations. The invention consists in the employment of mitered or beveled gear-wheels, either in the form of circular wheels, ellipses, or regular or irregular cams, eccentrically mounted on shafts at an angle with each other, as more fully hereinafter set forth.

In the drawing, A is the driving-shaft, and B the counter or driven shaft, their adjacent ends being journaled in the standard C at right angles with each other, and on the same horizontal plane, so that a prolongation of their respective axes would intersect at the point $a$ in Fig. 2. D is a toothed miter-wheel, eccentrically mounted on the shaft A, and D' is a similar wheel on the shaft B, meshing with the first, the teeth at the "throw" or most distant point from the hub engaging with those of the gear D nearest its hub, so that if the shaft A has a continuous rotary motion the shaft B will have imparted to it an alternately-fast-and-slow motion, determined by the size of the gears and the throw of their eccentrics. The pitch or inclination of the faces of the teeth varies, their lines being struck to converge at the point where a prolongation of the axes of their respective shafts would intersect, as shown by the dotted lines in the drawing, instead of converging on a prolongation of the central axes of the gears themselves, as in ordinary beveled gears. E is a face-plate at the end of the shaft B, and to whose wrist-pin $b$ the connecting-rod F is strapped, and gives motion to the levers G G', which operate the shedding apparatus of a loom, the latter forming no part of the present invention, but merely shown to exhibit its application.

Heretofore the shedding mechanism of looms has been operated by the crank-shaft through a pair of miter-gears, giving a continuous motion to the counter-shaft which actuates the shedding mechanism. The shed remains open such a short length of time that the shuttle has to be driven through with great force in using soft yarn, breaking the filling very frequently, thereby retarding the production of the cloth and impairing the quality. In such cases the only remedy was to use a hard-spun strong filling, which gives a harsh handle to the goods, retards the felting process in the fulling department, thereby injuring the colors, general appearance, and handle of the finished cloth. Besides this, the quick shedding motion strains the warp-threads, necessitating the use of hard-twisted warp when softer warp would make better goods. Again, the shuttle has to be driven with such force to get through before the shed closes on it that the least thing throws it out. More shuttles are broken, more persons are endangered, and more weight added to the loom; consequently, the wear and tear in the pickers, picking-arms, shuttles, and the picking or shuttle-driving mechanism is proportionately great. Now, by the appliance of the eccentric miter-gears D D' the shed remains open longer, approaches the tension of the warp at the extreme opening of the shed slower, and the shuttle can be driven slower without reducing the speed of the loom, running it lighter with less stress on warp and filling, and less wear and and tear to the whole picking apparatus, which are absolutely essential to the manufacture of "low stock" goods with any degree of success. This improvement can be applied to any loom at a very small expense, when its speed can with safety be increased ten per cent., softer warp and filling can be used, giving the cloth a better handle, and thus a better value, besides reducing largely the item of repairs. In other machinery, where two or more slow-advancing and quickreturn motions are required, the driven cam may be readily adapted to give such by changing its peripheral outline or configuration.

What I claim as my invention, and desire to secure by Letters Patent, is—

The combination of the eccentric miter-wheels D and D', the shafts A and B, the face-plate E, and the levers F, G, and G', all constructed, arranged, and operated as described and shown, for the purposes set forth.

DANIEL E. KEATING.

Witnesses:
SLATER LAYCOCK,
C. O. WASSON.